(12) United States Patent
Snyder, II et al.

(10) Patent No.: US 9,753,859 B2
(45) Date of Patent: Sep. 5, 2017

(54) INPUT OUTPUT VALUE PREDICTION WITH PHYSICAL OR VIRTUAL ADDRESSING FOR VIRTUAL ENVIRONMENT

(71) Applicant: Cavium, Inc., San Jose, CA (US)

(72) Inventors: Wilson Parkhurst Snyder, II, Holliston, MA (US); Michael Sean Bertone, Marlborough, MA (US)

(73) Assignee: Cavium, Inc., San Jose, CA (US)

( * ) Notice: Subject to any disclaimer, the term of this patent is extended or adjusted under 35 U.S.C. 154(b) by 108 days.

(21) Appl. No.: 14/874,460

(22) Filed: Oct. 4, 2015

(65) Prior Publication Data
US 2017/0097895 A1    Apr. 6, 2017

(51) Int. Cl.
*G06F 12/00* (2006.01)
*G06F 12/10* (2016.01)

(52) U.S. Cl.
CPC ........ *G06F 12/10* (2013.01); *G06F 2212/654* (2013.01)

(58) Field of Classification Search
None
See application file for complete search history.

*Primary Examiner* — John A Lane
(74) *Attorney, Agent, or Firm* — pkalousek.ip (57) ABSTRACT

Method and system embodying the method for input/output value determination at a processor core, comprising generating an I/O instruction comprising at least a physical or a virtual address; comparing the address with a relevant database of I/O devices addresses. When the comparing is successful determining the I/O device or a state on the I/O device to receive the I/O instruction in accordance with the address; setting a value of a first register to a value identifying the determined I/O device or the state on the I/O device; predicting a value to be set in a second register in accordance with the address; and setting a value of a third register. Providing I/O instruction other than a request I/O instruction to the I/O device or the state on the I/O device, which sets a register to a value according to the I/O instruction and reports the value to the processor core.

46 Claims, 7 Drawing Sheets

INPUT OUTPUT VALUE PREDICTION WITH PHYSICAL OR VIRTUAL ADDRESSING FOR VIRTUAL ENVIRONMENT

BACKGROUND

1. Field

The present disclosure relates to communications in computer networks. More particularly, this invention is directed toward input and/or output (I/O) value prediction with physical or virtual addressing for virtual environment.

2. Description of Related Technology

In computer systems, a processor may comprise one or more independent units of electronic circuitry (called cores), performing basic arithmetic, logical, control, and I/O operations by carrying out instructions of a computer program. In particular, to access data from I/O devices, the processor uses I/O instructions, e.g., load, store, request, and other instructions known to a person of ordinary skill in the art. The data access cannot utilize caching techniques due to the fact that the accessed data is not normal memory-like, that is for writable memory there is no assurance that a load from a specific location returns the most recently stored data at that location; two loads from a specific location, without a store in between, return the same data for each load; and for a read-only normal memory two loads from a specific location return the same data for each load. Consequently, the data access is subject to long latency while the I/O instruction, e.g., a load/store instruction is sent to the I/O device and the IO device responds, e.g., returns the data.

Figure 1:
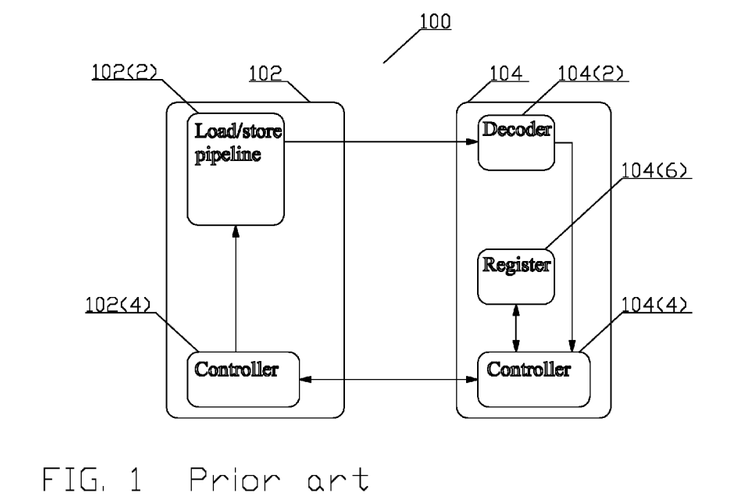
FIG. 1 depicts a conceptual structure 100 of I/O data access in accordance with known aspects.

FIG. 1 depicts a conceptual structure 100 of I/O data access in accordance with known aspects. A processor core 102 generates an I/O instruction as a part of its normal instruction issue and a load/store pipeline 102(2) under the control of a controller 102(4). A load I/O instruction comprises a structure comprising a physical address from which to load data; a store I/O instruction comprises a structure comprising data and a physical address to which to store the data. The I/O instruction, e.g., a load/store I/O instruction is forwarded to the I/O device 104. The load/store I/O instruction is provided to a decoder 104(2), which decodes the load/store I/O instruction, and provides the result of the decoding to a controller 104(4). The controller 104(4) carries out an action, i.e., to store data to or to load data from the provided physical address, in accordance with the provided result of the decoding. An initiation of the action causes a register 104(6) to be set to a value. A processor register is a small amount of storage available as part of a CPU or other digital processor. Such registers are (typically) addressed by mechanisms other than main memory and can be accessed more quickly. Almost all computers, load-store architecture or not, load data from a larger memory into registers where it is used for arithmetic, manipulated, or tested, by some machine instruction. By means of an example, the action may comprise ringing a doorbell to notify the I/O device 104 that there is an action to be carried out by the I/O device, e.g., a Direct Memory Transfer (DMA) and the initiation of the action may set a value of a BUSY bit in the register 104(6) to true. The I/O device 104 completes the action, either based on internal activity or on receiving another I/O instruction. Such another I/O instruction may comprise, e.g., a load/store I/O instruction to abort the pending I/O instruction. The action completion results in the controller 104(4) carrying out a final action, which causes the register 104(6) value to change. Thus, continuing with the example supra, the final action may comprise the DMA operation being completed and the completion of the action may set the value of the BUSY bit in the register 104(6) to false. At any time during the above-disclosed sequence of events, the processor core 102 may issue another I/O instruction, e.g., a request I/O instruction, to determine the value in the register 104(6). A request I/O instruction comprises a structure comprising a physical address from which to read data. To this end, the processor core 102 generates a request I/O instruction as part of its normal instruction issue and a load/store pipeline 102(2), and forwards the request I/O instruction to the I/O device 104. The request I/O instruction is provided to a decoder 104(2), which decodes the I/O request instruction, and provides the result of the decoding to the controller 104(4). The controller 104(4) carries out the action of reading the value in the register 104(6). The I/O device 104 returns the value in the register 104(6) to the processor core 102 via the load/store pipeline 102(2) by means of the controllers 104(4), 102(4).

This request and response is subject to latency while the request I/O instruction is sent to the I/O device and the I/O device returns the data.

Figure 2:
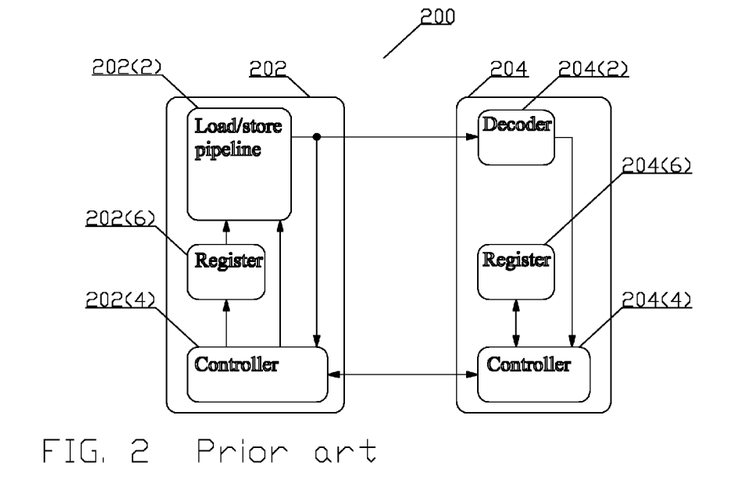
FIG. 2 depicts a conceptual structure 200 of I/O data access in accordance with known aspects.

One possible approach to the above-identified problems identified supra is disclosed in a conceptual structure 200 illustrated in FIG. 2. A processor core 202 generates an I/O instruction as a part of its normal instruction issue and a load/store pipeline 202(2) under the control of a controller 202(4). The load I/O instruction comprises a structure comprising a physical address from which to load data; the store I/O instruction comprises a structure comprising data and a physical address to which to store the data. The I/O instruction, e.g., a load/store I/O instruction is forwarded to the I/O device 204 and provided to a controller 202(4).

The controller 202(4) compares the physical address from the I/O instruction with a database, i.e., an organized collection of physical address assigned to the I/O device. The database may comprise any structure suited for the particular data, i.e., lists, lists of lists, tables, matrices, and other structures known to a person of ordinary skill in the art. When the physical address from the I/O instruction is matching a physical address in the database, the controller 202(4) determines a value to which a register 204(6) will be set by the controller 204(4) and sets the value in the register 202(6) to the value. The value to which a register 204(6) will be set by the controller 204(4) may be determined, e.g., from a subset of bits in the physical address.

When, on the other hand, the physical address from the I/O instruction is not matching a physical address in the database, the controller 202(4) does not carry any processing regarding the register 202(6).

The load/store I/O instruction forwarded to the I/O device 204 is provided to a decoder 204(2), which decodes the load/store I/O instruction, and provides the result of the decoding to a controller 204(4). The controller 204(4) carries out an action, i.e., to store data to or to load data from the provided physical address, in accordance with the provided result of the decoding. An initiation of the action causes a register 204(6) to be set to a value. By means of an example, the action may comprise ringing a doorbell to notify the I/O device that there is an action to be carried out by the I/O device 204, e.g., a Direct Memory Transfer (DMA) and the initiation of the action may set a value of a BUSY bit in the register 204(6) to true. The I/O device 204 completes the action, either based on internal activity or on receiving another I/O instruction. Such another I/O instruction may comprise, e.g., a load/store I/O instruction to abort the pending I/O instruction. The action completion results in the controller 204(4) carrying out a final action, which causes the register 204(6) value to change. Thus, continuing with the example supra, the final action may comprise the DMA operation being completed and the completion of the action may set the value of the BUSY bit in the register 204(6) to false.

In addition to the above-disclosed manner of setting or changing the value in the register 204(6) in response to the I/O instruction generated by the processor core 202 either directly, i.e., upon receiving the I/O instruction or indirectly, i.e., upon completing the action requested by the I/O instruction; the value in the register 204(6) may be set or changed by an autonomous input from the I/O device 204. By means of an example, such change may be due to the I/O device 204 being reset, powered down and powered up, and other autonomous I/O device events known to a person of ordinary skill in the art.

The value or the change thereof in the register 204(6) is being monitored by the controller 204(4), which returns the detected value in the register 204(6) to the controller 202(4). The controller 202(4) then changes the value in the register 202(6) to account for changes in the value in register 204(6) caused by the I/O device 204. Thus, after a latency caused by the I/O device 204 providing the value in register 204(6) by means of the controller 204(4) to the controller 202(4) and the controller 202(4) updating the value in the register 202(6), the value in the register 202(6) and the value in the register 204(6) are identical.

Based on the foregoing, if the processor core 202 wishes to know the value in the register 204(6), the processor core 202 does not need to issue another I/O instruction, e.g., a request I/O instruction, as disclosed supra to obtain the value directly from register 204(6), but can instead carry out an I/O transaction to read the value from the register 202(6), which reflects any changes either to the processor core 202 request or to the I/O device 204 autonomous action as disclosed supra. Consequently, the latency caused by sending the request I/O instruction to the I/O device 204 and the I/O device 204 responding by returning the data is eliminated.

The disclosure of FIG. 2 and associated text cannot be easily adapted to computer systems employing virtualization. As well known to a person of ordinary skill in the art, virtualization is a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

Based on the foregoing a single processor core may serve several virtual I/O devices, which implies a requirement to keep track of initial actions and registers' values for each of the virtual I/O devices, which may became difficult to accomplish with increasing numbers of the virtual I/O devices. Additionally, the hypervisor may move a process executed by a processor core to a different processor core, which implies a requirement to move the initial actions and the registers' values for each of the virtual I/O devices to the different processor core. Although at least theoretically possible to be accomplished by modifying the hypervisor's software, such is undesirable for compatibility with different hypervisors and, furthermore, the move would introduce latency.

Accordingly, there is a need in the art for I/O load value prediction with physical or virtual addressing for virtual environment, providing a solution to the above identified problems, as well as additional advantages.

SUMMARY

In an aspect of the disclosure, an apparatus implementing a method for input and/or output (I/O) load value prediction with physical or virtual addressing for virtual environment according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. In the drawings, an expression "_X" in a reference indicates an instance of an element, while and expression "(X)" indicates a sub-block in a drawing where helpful for better understanding. Any unreferenced single and/or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 3:
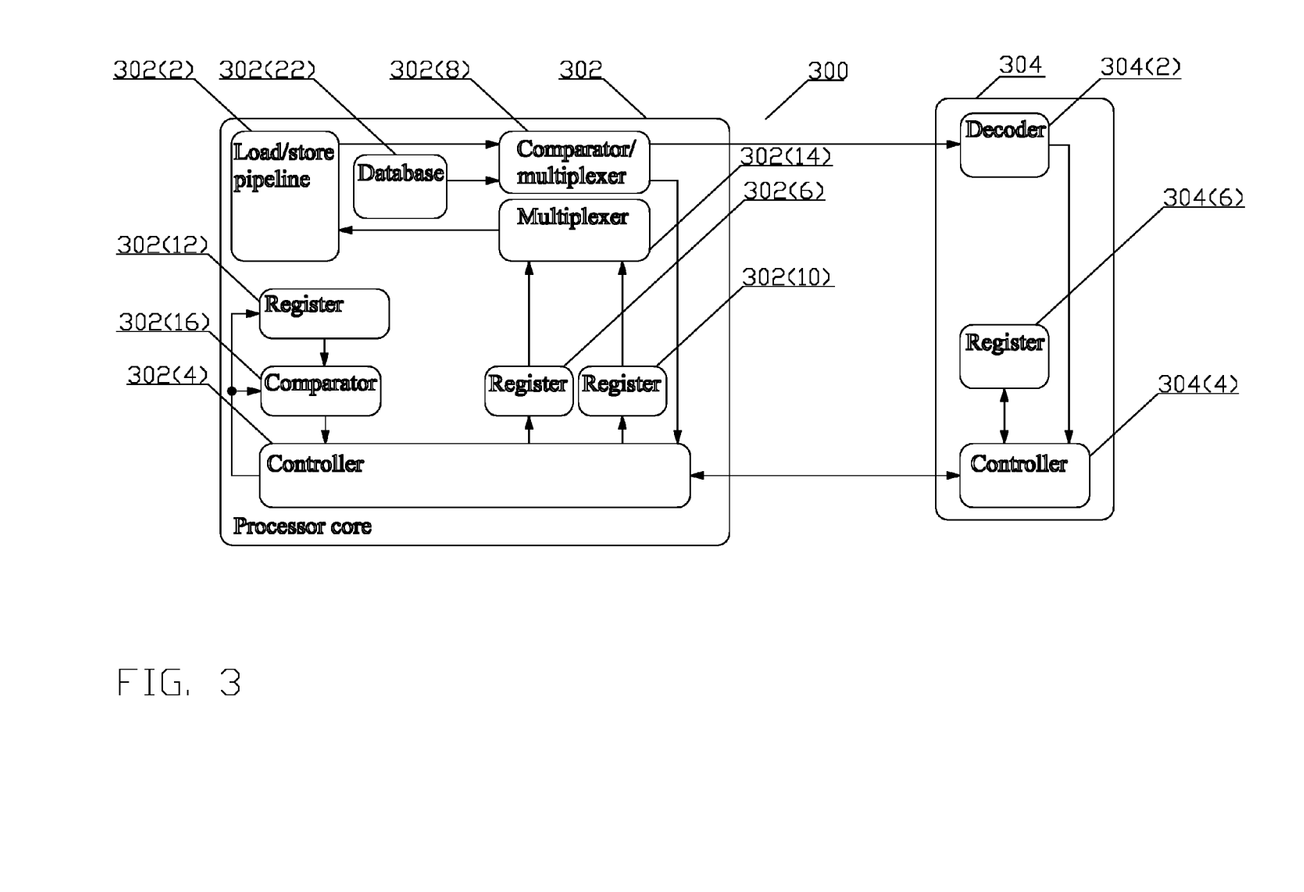
FIG. 3 depicts a conceptual structure 300 of I/O data access using physical address in a virtual environment in accordance with aspects of this disclosure.

FIG. 3 depicts a conceptual structure 300 of I/O data access for virtual environment in accordance with aspects of this disclosure. A processor core 302 generates an I/O instruction as a part of its normal instruction issue and a load/store pipeline 302(2) under the control of a controller 302(4). The load I/O instruction comprises a structure comprising a physical address from which to load data; the store I/O instruction comprises a structure comprising data and a physical address to which to store the data. The I/O instruction, e.g., a load/store I/O instruction is provided to one of the plurality I/O device 304_X, or, alternatively, to a state on the specific I/O device 304_X, to which is the I/O instruction addressed, and to a controller 302(4) via a comparator/multiplexer 302(8).

An I/O device is any device communicatively connected to a central processing unit and/or a main memory to enable transfer of information in response to an I/O instruction. Such a device may comprise, e.g., a disc drive, a modem, a Universal Serial Bus device, and/or other devices known to a person of ordinary skill in the art.

In one aspect, the I/O device comprises a packet work module in a network services processor. As known to a person of ordinary skill in the art, a network service processor performs packet processing at layers L2-L7, of the Open Systems Interconnection (OSI) model. As disclosed in e.g., U.S. Pat. No. 7,895,431 B2, to enable packet processing so that the packets may be forwarded on a wire-speed, the packet processing (work) to be performed on a particular packet includes a plurality of packet processing operations (pieces of work). Each piece of work has an associated tag. The tag allows the work order module to schedule work such that the work can be performed in parallel by a plurality of processor cores while ensuring that execution of the work is ordered and synchronized. When a processor core desires to perform work, the processor core transfers a tag to the work order module through an Input/Output (IO) instruction as disclosed in detail in FIG. 8 and associated text in at least col. 15, line 21-col. 16, line 25 of the U.S. Pat. No. 7,895,431 B2, incorporated herein by reference.

In order to determine the I/O device 304_X which is to receive the I/O instruction, the comparator/multiplexer 302(8) compares the physical address from the I/O instruction with a database 302(22) of physical addresses of the I/O devices. In one aspect, the database 302(22) comprise a pre-determined list; however, any other structure suitable for the data stored in the database, i.e., lists, lists of lists, tables, matrices and other structures known to a person of ordinary skill in the art may be used. The database 302(22) may be hard-coded based on a known, fixed I/O devices and their physical addresses configuration or, alternatively, determined by assigning the physical addresses to the I/O devices by an operating system upon initialization.

When the physical address from the I/O instruction is matching a physical address in the database 302(22), the controller 302(4) examines the I/O instruction and determines, which I/O device 304_X, or which state on the I/O device 304_X, is to receive the I/O instruction. The I/O device 304_X, or the state on an I/O device 304_X may be identified, e.g., by at least a subset of bits in the physical address. Consequently, in one aspect, the comparator/multiplexer 302(8) examines a value of a first subset of bits of the physical address, e.g., bits 36-39, and determines the I/O device 304_X, or the state of the I/O device 304_X according to the value of the first subset of bits. The correspondence between the value of the first subset of bits and the I/O device 304_X, or the state on the I/O device 304_X, may be determined by a look up table, a mathematical formula, a programmable range, and/or other manner known to a person of ordinary skill in the art.

The controller 302(4) sets an identifier of the specific I/O device 304_X, or the state on the specific I/O device 304_X in a register 302(12).

The controller 302(4) further predicts a value to which a register 304(6) will be set by the controller 304(4), and sets the value in the register 302(6) to the predicted value, and because the values in the registers 302(6) and 304(6) are predicted to be identical, the controller 302(4) further sets an entry in a register 302(10) to valid. The value to which a register 304(6) will be set by the controller 304(4) may be predicted, e.g., from a subset of bits in the physical address or, for a store instruction only, from a subset of bits in the store data.

When a value of a second subset of bits of the physical address, e.g., bit 48, equals a first pre-determined value indicating the I/O device 304 space, e.g., logical 1, and a value of a third subset of bits of the physical address indicating a memory, e.g., bits 40-47 equals a second pre-determined value, e.g., 0x60, then the value in a register 302(6) is set; otherwise, when the value of the second subset of bits of the physical address, e.g., bits 40-47 equals the second pre-determined value, e.g., 0x63 the value in a register 302(6) is cleared.

Should the instruction be a store instruction, the value to which a register 304(6) will be set, is determined from a subset of bits in the physical address or from a subset of bits in the store data in a similar manner.

Although as disclosed, the action carried out by the controller 302(4) is deterministic; nevertheless, the action and the value produced are termed predicted with the meaning that either the controller is aware of a value in the register 302(6) and is aware that the value is valid, as disclosed supra, or the controller is aware of a value in the register 302(6) and is aware that the value may not be valid as disclosed infra.

When, on the other hand, the physical address from the I/O instruction is not matching a physical address in the database 302(22), e.g., because the I/O instruction is directed to other than an I/O device, e.g., the main memory, the controller 302(4) does not carry any processing regarding the registers 302(6), 302(10), and 302(12).

The load/store I/O instruction provided to the I/O device 304_1 is provided to a decoder 304(2), which decodes the load/store I/O instruction, and provides the result of the decoding to a controller 304(4). The controller 304(4) carries out an action, i.e., to store data to or to load data from the provided physical address, in accordance with the provided result of the decoding. An initiation of the action causes the register 304(6) to be set to a value. By means of an example, the action may comprise ringing a doorbell to notify the I/O device that there is an action to be carried out by the I/O device, e.g., a Direct Memory Transfer (DMA) and the initiation of the action may set a value of a BUSY bit in the a register 304(6) to true. The I/O device 304_1 completes the action, either based on internal activity or on receiving another I/O instruction. Such another I/O instruction may comprise, e.g., a load/store I/O instruction to abort the pending I/O instruction. The action completion results in the controller 304(4) carrying out a final action, which causes the register 304(6) value to change. Thus, continuing with the example supra, the final action may comprise the DMA operation being completed and the completion of the action may set the value of the BUSY bit in the register 304(6) to false, i.e., clear the BUSY bit.

In addition to the above-disclosed manner of setting or changing the value in the register 304(6) in response to the I/O instruction generated by the processor core 302 either directly, i.e., upon receiving the I/O instruction or indirectly, i.e., upon completing the action requested by the I/O instruction; the value in the register 304(6), the register 302(6), the register 302(10), and the register 302(12) may be set or changed by an autonomous input from the I/O device 304. By means of an example, such change may be due to the I/O device 304 being reset, powered down and powered up, and other autonomous I/O device events known to a person of ordinary skill in the art. The value, to which the register 304(6), the register 302(6), and the register 302(10) are set depends on the conditions of the autonomous I/O event.

By means of an example, upon orderly reset, the I/O device 304 may via the controller 304(4) set the value in the register 304(6) to clear and indicate such an update together with an indication which I/O device 304_X, or the state on the specific I/O device 304_X, is providing the update notification to the processor core 302 via the controller 304(4). In response, the controller 302(4) may set the register 302(6) to clear, and the value in the register 302(10) to valid, thus indicating that the I/O device 304 is not carrying out any action, i.e., is not BUSY.

By means of another example, the values of the registers 302(6), 302(10), and 302(12) may have been set correctly, but may no longer correspond to the state of the I/O device 304_X. Such a condition may occur. e.g., when the hypervisor moves the process and associated I/O device 304 originally running on a processor core 302, to a different processor core (not shown). To prevent value mismatch at the registers' at the processor cores and the I/O device 304_X, the I/O device 304 may via the controller 304(4) set the value in the register 304(6) to clear, and indicate such an update together with an indication which I/O device 304_X, or the state on the specific I/O device 304_X, is providing the update notification to both processor cores. In response, the controller 302(4) sets the value in the register 302(6) to clear, and the value in the register 302(10) to false, thus indicating that the I/O device 304 is undetermined, thus the processor core 302 should not rely on the value in the registers 302(6). The different processor core (not shown) responds by following the processing steps described in reference to the processor core 302.

To enable setting or changing the value in the register 302(6), the controller 304(4) monitors the value or change thereof of the register 304(6), and provides the detected value or a change thereof together with an indication which I/O device 304_X, or the state on the specific I/O device 304_X, is providing the update notification to the processor core 302 via the controller 304(4). The indication which I/O device 304_X or the state on the specific I/O device 304_X is providing the update notification is compared by comparator 302(16) with the register 302(12) and the result of the comparison is provided to the controller 302(4). If the result of the comparison is positive, the update notification has been provided by the I/O device 304_X, or the state on the specific I/O device 304_X; consequently, the controller 302(4) causes the update notification to change the value in the register 302(6) and sets the value in the register 302(10) to valid. Otherwise, the update has been provided by a different the I/O device 304_X or different state on the specific I/O device 304_X; consequently, the controller 302(4) causes the update notification to be ignored.

When the processor core 302 wishes to know the value in the register 304(6), the processor core 302 issues another I/O instruction, e.g., by generating a request I/O instruction as part of its normal instruction issue and a load/store pipeline 302(2), and forwards the request I/O instruction to the comparator/multiplexer 302(8).

The comparator/multiplexer 302(8) compares the physical address from the request I/O instruction with a database 302(22) of physical address that to the I/O device in order to determine the I/O device 304_X which is to receive the I/O instruction. When, the physical address from the I/O instruction is not matching a physical address in the database 302(22), the controller 302(4) does not carry any processing regarding the registers 302(6), 302(10), and 302(12).

When the physical address from the I/O instruction is matching a physical address in the database 302(22), the controller 302(4) examines the I/O instruction and determines, which I/O device 304_X, or which state of the I/O device 304_X, is to receive the I/O instruction. The comparator/multiplexer 302(8) then extracts at least the subset of bits that identifies the I/O device 304_X, or the state on the specific I/O device 304_X for which the request I/O instruction is intended, and determines whether the I/O device 304_X, or the state on the specific I/O device 304_X, identified by the subset of bits matches an identifier of an I/O device 304_X in the register 302(12).

When there is no match to indicate that there is no value in the register 302(6) for the I/O device 304_X, or the entry in the register 302(10) is set to false to indicate that the value in the register 302(6) is undetermined, the multiplexer 302(8) notifies the controller 302(4), which causes the comparator/multiplexer 302(8) to forward the request I/O instruction to the specific I/O device 304_X, or to the state on the specific I/O device 304_X. The I/O device 304 processes the request I/O instruction as disclosed supra, i.e., the decoder 304(2) decodes the request I/O instruction, and provides the result of the decoding to a controller 304(4). The controller 304(4) carries out an action, i.e., to retrieve data from the register 304(6), in accordance with the provided result of the decoding, and returns the value in the register 304(6) to the controller 302(4). The controller 302(4) saves the returned value in the register 302(6), sets the value in register 302(10) to valid, and sets the identifier of the I/O device 304_X or the state on the specific I/O device 304_X, into the register 302(12).

When there is a match, and the controller 302(4) has determined in accordance with the physical address that the I/O instruction is a request I/O instruction, the controller 302(4) causes the comparator/multiplexer 302(8) to avoid forwarding the request I/O instruction, issues an I/O transaction to read the value from the register 302(6), and provides the value from the register 302(6) to the processor core 302 via the multiplexer 302(14). Consequently, the latency while the load request is sent to the I/O device 304 and the I/O device 304 returns the data is minimized.

The I/O data access for virtual environment in accordance with aspect(s) of this disclosure disclosed supra requires that virtual addresses used by the processor core are first translated to physical addresses by, e.g., a translation lookaside buffer (TLB), and only then further processing of an I/O instruction comprising the physical address may be carried out. However, such a translation introduces latency.

Figure 4:
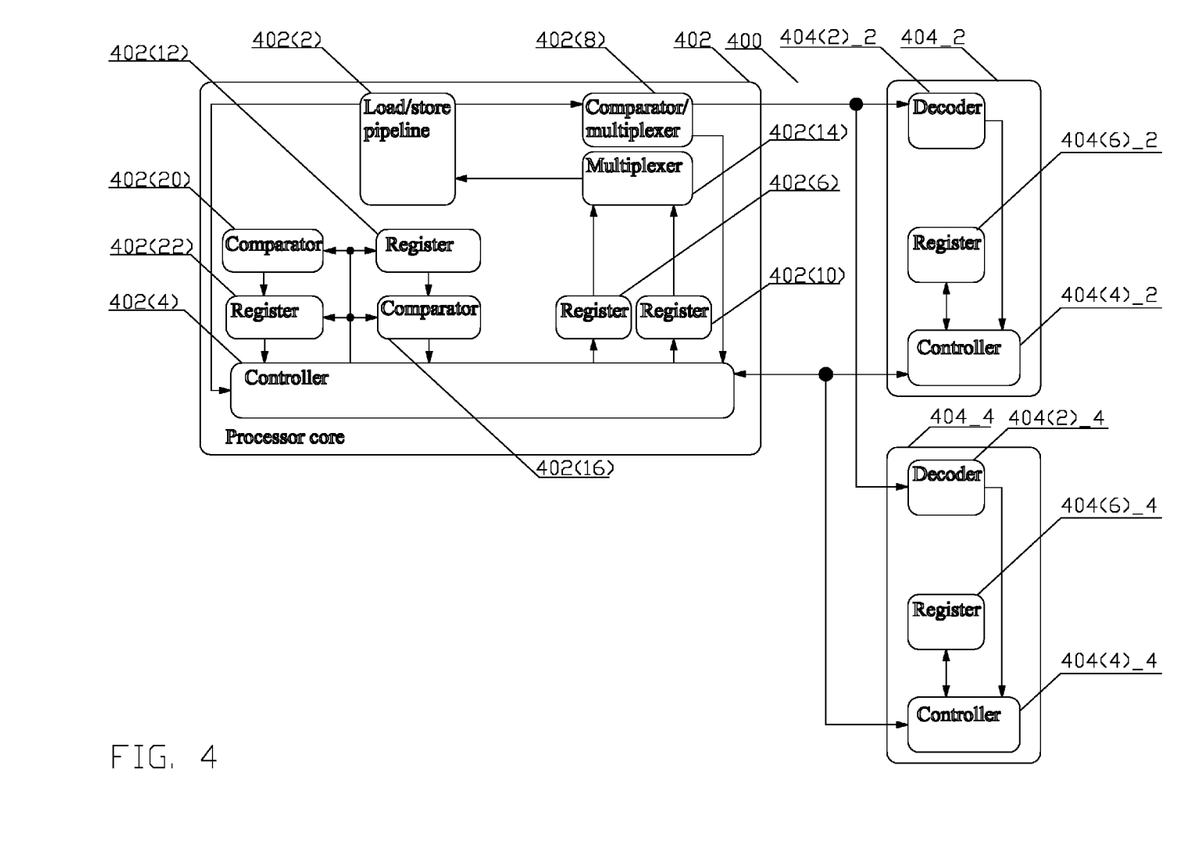
FIG. 4 depicts a conceptual structure 400 of I/O data access using physical address in a virtual environment in accordance with aspects of this disclosure.

FIG. 4 depicts a conceptual structure of I/O data access using virtual address in a virtual environment in accordance with an aspect of this disclosure. Use of virtual addresses eliminates the latency caused by the translation from virtual addresses to physical addresses.

A processor core 402 generates an I/O instruction as part of its normal instruction issue and a load/store pipeline 402(2), e.g., a load/store I/O instruction. The load I/O instruction comprises a structure comprising a virtual address from which to load data; a store I/O instruction comprises a structure comprising data and a virtual address to which to store the data. The load/store I/O instruction is provided to a virtual address comparator 402(20), where the I/O instruction's virtual address is compared with a database of existing virtual addresses, stored in register 402(22). The database may comprise any structure suited for the particular data, i.e., lists, lists of lists, tables, matrices and other structures known to a person of ordinary skill in the art.

Unlike the database of physical addresses, which can be pre-determined because a physical address belongs to an I/O device as disclosed supra, a virtual address does not belong to an I/O device but is a subject to mapping, the database of virtual addresses is built-on-the-fly. Each of the existing predicted virtual addresses has been generated the first time the I/O device has been accessed via a physical address in response to an I/O instruction comprising a virtual address as disclosed in detail infra.

Thus, when the virtual address of the compared I/O instruction is different from an existing virtual address in the database, the processor core 402 uses the TLB (not shown) to translate the virtual address to the physical address. The controller 402(4) updates the database of existing virtual addresses stored in register 402(22), by adding the virtual address of the compared I/O instruction. In one aspect, the translated physical address is used for further processing continues as disclosed in FIG. 3 and associated text supra. In another aspect, the controller 402(4) informs the processor core (302). The processor core (302) regenerates the I/O instruction and provides the I/O instruction to the virtual address comparator 402(20), where the I/O instruction's virtual address is compared with a database of existing virtual addresses stored in register 402(22). Because the database of existing virtual addresses has just be updated, the physical address corresponding to the virtual address is used for further processing as disclosed in FIG. 3 and associated text supra.

Additionally, the controller 402(4) stores/updates the virtual address corresponding to the translated physical address together with virtual fields, associated with the virtual address in the register 402(22). Such virtual fields indicate an execution state of the virtual machine, setup by earlier instructions, depending on the architecture, as known to a person of ordinary skill in the art, and may comprise a Virtual Machine Identifier (VMID), indicating which guest operating system is generating the virtual address; Address Space Identifier (ASID). identifying which user process of a given guest is generating the virtual address; Global, indicating if ASID applies, e.g., whether the ASID applies to all user processes executing by a specific guest operating system, or whether the ASID applies to only to a specific user process executing by a specific guest operating system; and an Exception Level (EL), indicating an exception level, which specifies if the translation is for a hypervisor, a guest, or a user process. However, a person or ordinary skill in the art will appreciate that not all or additional virtual fields required by a specific virtual machine memory architecture known in the art may be used. Such additional virtual fields may comprise, e.g., page attributes that indicate early acknowledgement of transactions.

Because of this store/update, when the processor core 402 generates another I/O instruction to a virtual address already present in the register 402(22), when the virtual address comparator 402(20) determines that the register 402(22) comprises an identical virtual address the TLB does not need to be used and the latency associated with the TLB translation is avoided. Because the virtual address of the I/O instruction is identical to the virtual address in the register 402(22), the physical address known to correspond to the virtual address of the I/O instruction may be used for the I/O instruction processing as disclosed in FIG. 3 and associated text supra, without incurring a latency due to the TLB translation because the correspondence is a mere look up.

Figure 5:
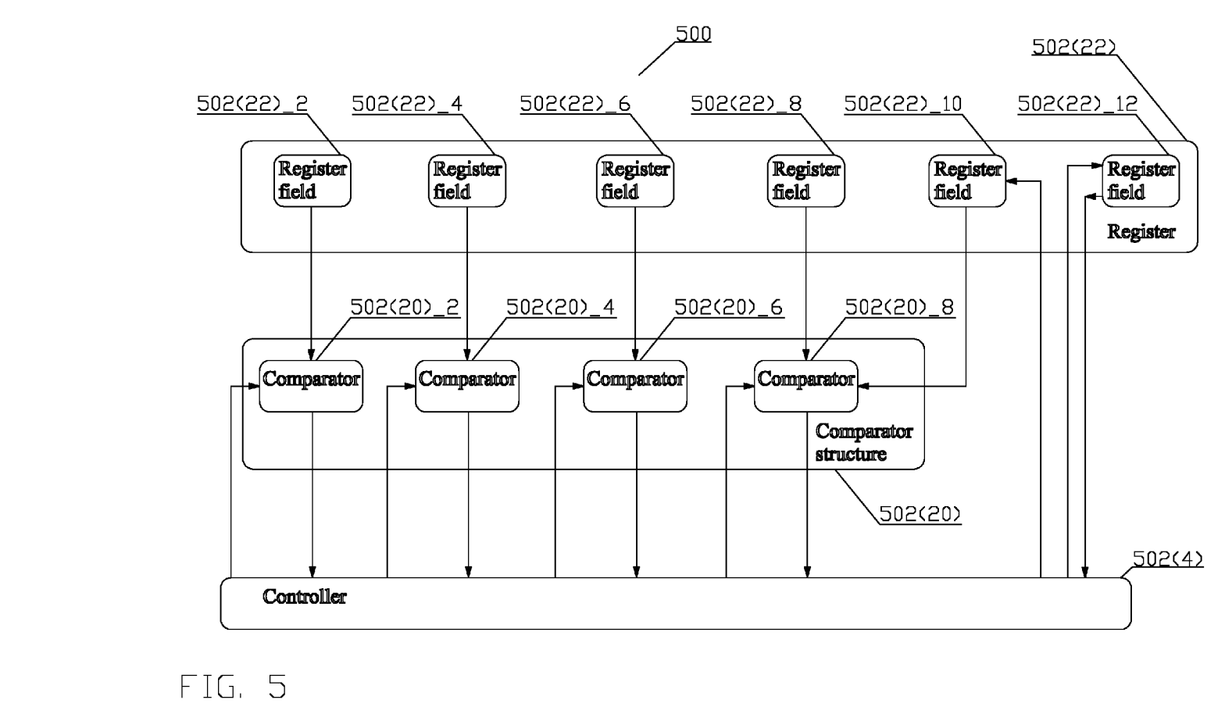
FIG. 5 depicts a conceptual structure 500 of a virtual translation entry in accordance with aspects of this disclosure.

FIG. 5 depicts a conceptual structure of a virtual translation entry in accordance with an aspect of this disclosure. A person of ordinary skill in the art will appreciate, that the structure of the register 502(22) is dependent on the architecture of the processor core 502. Consequently, the fields 502(22)_X compromising the structure of the register 502(22) may differ from the structure disclosed in FIG. 5 for a different processor architecture. Therefore, FIG. 5 and associated text are intended only to illustrate the concepts of the disclosure.

The comparator 502(20) will indicate that the virtual address of the I/O instruction is identical to the predicted virtual address if and only if the predicted virtual address entry 502(22)_X has a valid bit 502(22)_12 set by the controller 502(4). Additionally, the VA page, and the associated fields—the EL, the VMID provided by the controller 502(4) to the respective comparators 502(20)_2, 502(20)_4, and 502(20)_6, must be identical to the VA page 502(22)_2, the EL 502(22)_4, and the VMID 502(22)_6 stored in the register 502(22). The ASID provided by the controller 502(4) to the comparator 502(20)_8 must be identical to the ASID 502(22)_8 stored in the register 502(20) only if the global bit 502(22)_10 stored in the register 502(22)) is not set.

Although the aspect of FIG. 5 depicts the structure of the comparator 502(20) as plurality of comparators 502(20)_X enabling a parallel processing of the VA page and associated fields; in another aspect the structure of the comparator 502(20) may comprise a single comparator, processing the VA page and associated fields in serial manner. In yet another aspect a combination of serial and parallel processing may be used.

In one aspect, the size of the register 502(22) is a single page, e.g., 4 Kilo Bytes, so that the corresponding TLB may be minimum size. In another aspect, the size of the register 502(22) may comprise a plurality of pages to enable larger physical address region.

Figure 6A:
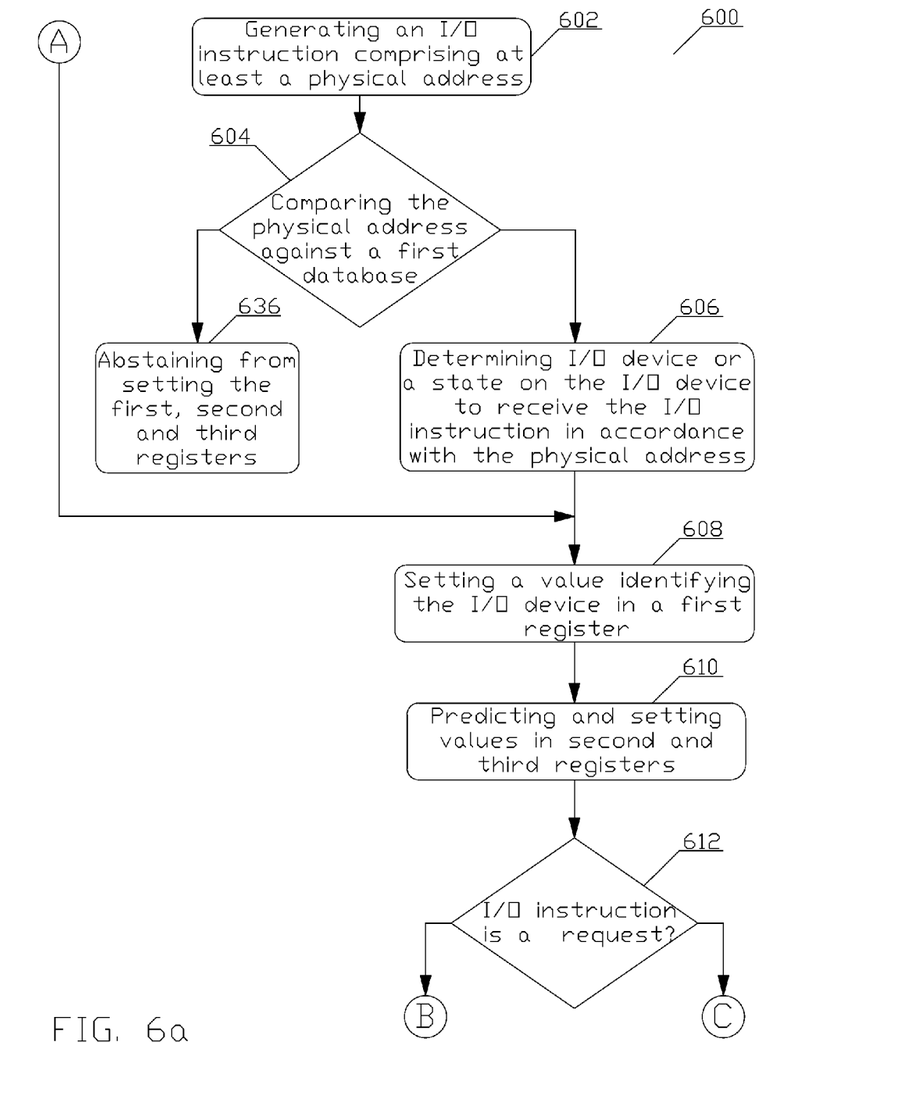
FIG. 6a depicts a first part of a flow chart 600 of a conceptual process for input/output value determination in a virtualized system in accordance with aspects of this disclosure.
Figure 6B:
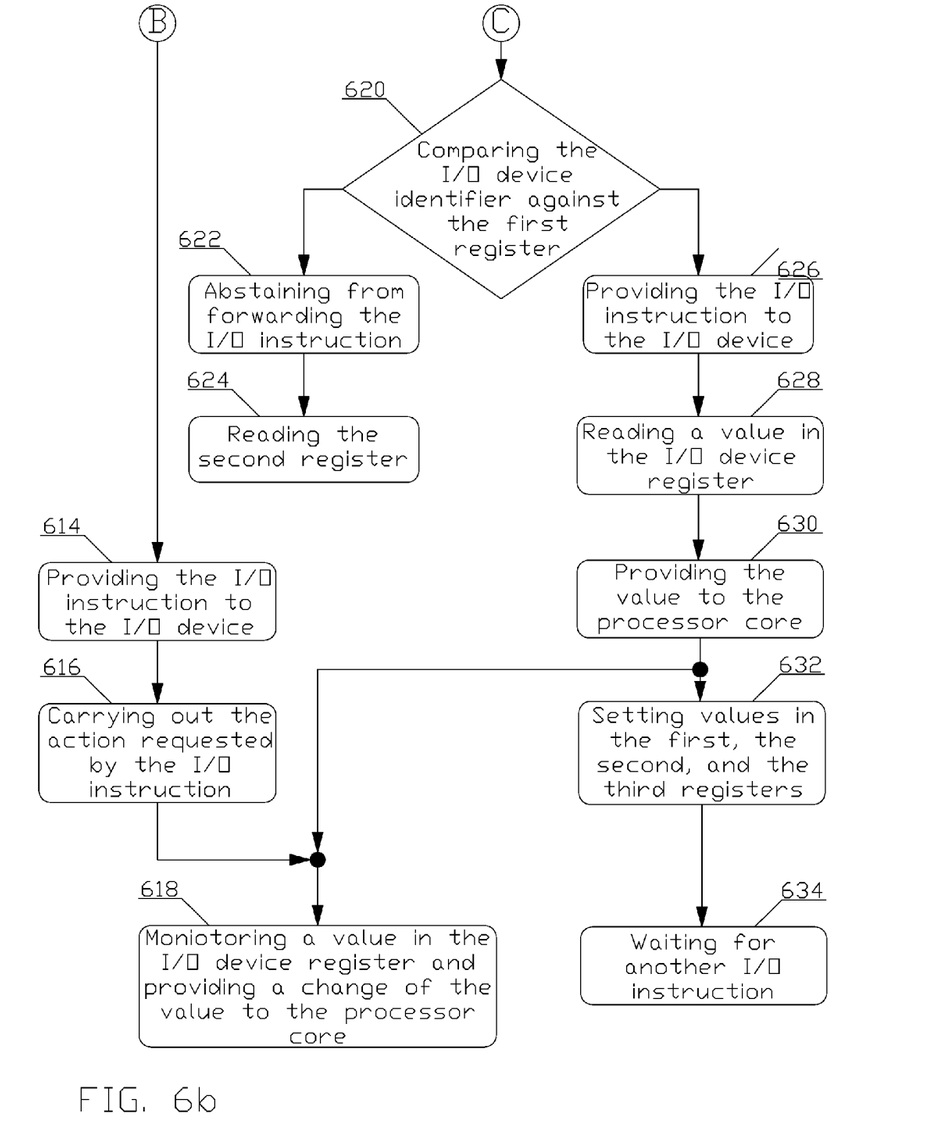
FIG. 6b depicts a second part of the flow chart 600 of the conceptual process for input/output value determination in the virtualized system in accordance with the aspects of this disclosure.
Figure 6C:
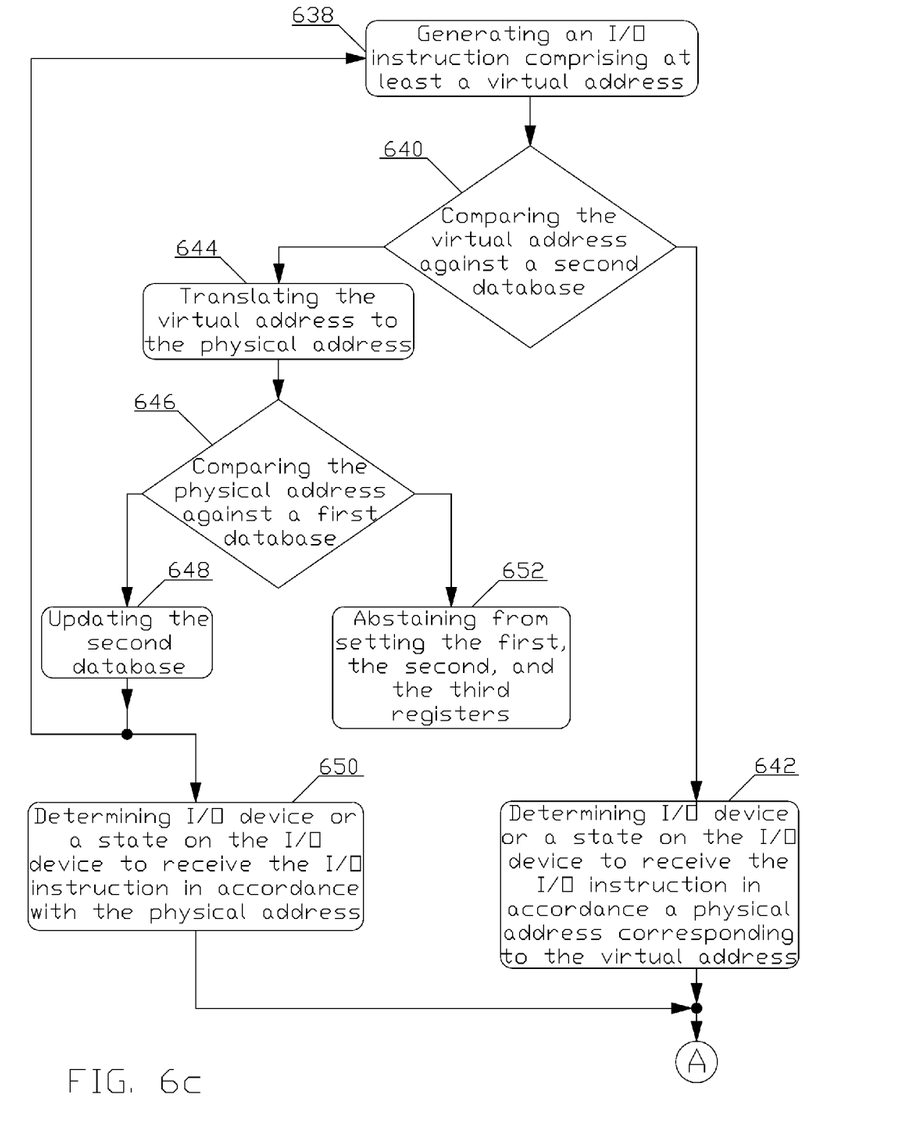
FIG. 6c depicts a third part of the flow chart 600 of the conceptual process for input/output value determination in a virtualized system in accordance with the aspects of this disclosure.

FIG. 6 depicts a flow chart of a conceptual process for input/output value determination in a virtualized system in accordance with aspects of this disclosure. To further clarify the relationship between certain structural elements of the conceptual structure of a virtualization system disclosed in greater details in FIGS. 3-5 and associated text, references to the structural elements are in parenthesis.

In block 602, a processor core (302) generates an I/O instruction comprising at least a physical address. The process continues in block 604.

In block 604, a comparator/multiplexer (302(8)) compares the physical address from the I/O instruction against a database of physical addresses (302(22)) that to I/O devices (304_X). When the comparison is successful, the process continues in block 606; otherwise, the process continues in block 636.

In block 606, the controller (302(4)) determines an I/O device (304_X) or a state on the I/O device (304_X) to receive the I/O instruction in accordance with the physical address. The process continues in step 608.

In step 608, the controller (302(4)) sets a value in a first register (302(12)) to a value indicating the determined I/O device (304_X) or the state on the I/O device (304_X). The process continues in block 610.

In block 610, the controller (302(4)) predicts and sets a value in a second register (302(6)) in accordance with the physical address, and sets a value in a third register (302(6)). The process continues in block 612.

In block 612, the controller (302(4)) determines the type of the I/O instruction. When the type of the I/O instruction is any but a request instruction, i.e., a load and/or a store I/O instruction, the process continues in block 614; otherwise, when the type of the I/O instruction is a request I/O instruction, the process continues in block 620.

In block 614, the controller (302(4)) provides the I/O instruction to the I/O device (304_X). The process continues in block 616.

In block 616, the I/O device (304_X) carries out the action requested by the I/O instruction. The process continues in block 618.

In block 618, the controller (304(4)) monitors the value or change thereof in a register 304(6) at the I/O device (304_X), and provides the detected value or a change thereof together with an indication which I/O device (304_X) or the state on the specific I/O device (304_X) is providing the update notification. A person of ordinary skill in the art will appreciate that the block 618 may occur at different place in the process in accordance the action generating the change.

When, in block 612, the controller (302(4)) determines that the I/O instruction is a request I/O instruction, in block 620, the controller 302(4) causes the comparator/multiplexer (302(8)) to compare whether the I/O device (304_X) or the state on the specific I/O device (304_X), identified to receive the I/O instruction against an identifier of an I/O device (304_X) in the register (302(12)). If the comparison is successful, the process continues in block 622; otherwise the process continues in block 626.

In block 622, the controller (302(4)) causes the comparator/multiplexer (302(8)) to avoid forwarding the I/O instruction to the I/O device (304_X). The process continues in block 624.

In block 624, the controller (302(4)) issues an I/O transaction to read the value from the register (302(6)), and provides the value from the register (302(6)) to the processor core (302) via the multiplexer (302(14)).

When, in block 620, the comparison is unsuccessful, in block 626, the controller (302(4)) instructs the comparator/multiplexer (302(8)) to provide the I/O instruction to the I/O device (304_X). The process continues in block 628.

In block 628, the controller (304(4)) retrieves the value from the register 304(6). The process continues in block 630.

In block 630, the controller (304(4)) provides the value to the processor core together with an indication which I/O device (304_X), or the state on the specific I/O device (304_X), is providing the value via the controller (302(4)).

The process continues in block 618, wherein the controller (304(4)) monitors the value or change thereof in a register 304(6) at the I/O device (304_X), and in block 632.

In block 632, the controller (302(4)), sets values in the first register (302(12)), the second register (302(6)), and third register (302(6)). The process continues in block 634.

In block 634, the process awaits another I/O instruction.

When the comparison carried out in block 604 supra is unsuccessful, in block 636, the controller (302(4)) abstains from setting a value in any of the first, second, and third registers. The process awaits a new I/O instruction.

The flow chart blocks 602 through 636 supra. discloses processing wherein the I/O instruction comprises at least a physical address. When the I/O instruction comprises at least a virtual address the processing is modified as disclosed in blocks 602(v) through 648 infra.

In block 638, a processor core (302) generates a I/O instruction comprising at least a virtual address. The process continues in block 640.

In block 640, a comparator/multiplexer (302(8)) compares the virtual address from the I/O instruction against a database of virtual addresses (402(22)) that may be mapped to the I/O devices (304_X). When the comparison is successful, the process continues in block 642; otherwise, the process continues in block 644.

In block 642, the controller (302(4)) determines an I/O device (304_X) or a state on the I/O device (304_X) to receive the I/O instruction in accordance with the physical address corresponding to the virtual address. The process continues in block 608.

In step 644, the controller (302(4)) translates the virtual address to a physical address using a TLB. The process continues in block 646.

In block 646, the comparator/multiplexer (302(8)) compares the physical address against a database of physical addresses that to the I/O devices (304_X). When the comparison is successful, the process continues in block 648; otherwise, the process continues in block 652.

In block 648, the controller (302(4)) updates the database of virtual addresses that may be mapped to the I/O devices (304_X). In one aspect, the process continues in block 638, by informing the processor core (302). The processor core (302) regenerates the I/O instruction comprising at least the virtual address and provides the virtual address to the comparator/multiplexer (302(8)). The comparator/multiplexer (302(8)) compares virtual address from the I/O instruction against the database of virtual addresses that may be mapped to the I/O devices (304_X). Since the database has just been updated, the comparison is successful, and the process continues in block 642.

In another aspect, the process continues in block 650, where the controller (302(4)) determines an I/O device (304_X) or a state on the I/O device (304_X) to receive the I/O instruction in accordance with the physical address determined by the translation is block 644. In this aspect, the process continues in block 608

In block 652, the controller (302(4)) abstains from setting a value in any of the first, second, and third registers. The process awaits a new I/O instruction.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for input/output (I/O) value determination at a processor core, comprising:
   generating an I/O instruction comprising at least a physical address;
   comparing the physical address from the I/O instruction with a database of physical addresses assigned to I/O devices and when the comparing is successful
   determining the I/O device or a state on the I/O device to receive the I/O instruction in accordance with the physical address;
   setting a value in a first register to a value identifying the determined I/O device or the state on the I/O device;
   predicting a value to be set in a second register in accordance with the physical address; and
   setting a value in a third register.

2. The method as claimed in claim 1, wherein when the comparing is unsuccessful:
   abstaining from setting values in any of the first, the second, and the third registers.

3. The method as claimed in claim 1, wherein the determining an I/O device or a state on the I/O device to receive the I/O instruction in accordance with the physical address, comprises:
   examining a value of a first subset of bits of the physical address; and
   determining the I/O device or the state of the I/O device according to the value of the first subset of bits.

4. The method as claimed in claim 1, wherein predicting a value to be set in a second register in accordance with the physical address, comprises:
   determining values of a second and third subsets of bits of the physical address;
   setting the value in the second register to a first value if the third subsets of bits equals a first predetermined value; and
   setting the value in the second register to a second value if the third subsets of bits equals a second predetermined value.

5. The method as claimed in claim 1, further comprising:
   determining a type of the I/O instruction;
   when the type of I/O instruction is other than a request I/O instruction providing the I/O instruction to the I/O device; and
   setting a value of a register at the I/O device according to the provided I/O instruction.

6. The method as claimed in claim 5, when the type of I/O instruction is a request I/O instruction, comprising:
   comparing the identifier of the I/O device or the state on the I/O device with the value in the first register, and when the comparing is successful
      abstaining from forwarding the request I/O instruction to the I/O device; and
      reading the value in the second register.

7. The method as claimed in claim 6, wherein when the comparing is unsuccessful, comprising:
   providing the request I/O instruction to the I/O device;
   reading a value in the register at the I/O device; and
   reporting the value together with an identifier of the I/O device or the state of the I/O device providing the value to the processor core.

8. The method as claimed in claim 1, further comprising:
   monitoring a value or change thereof in a register at the I/O device; and
   providing the value or a change thereof together with an identifier of the I/O device or the state on the I/O device providing the value to the processor core upon detecting the change.

9. The method as claimed in claim 1, further comprising:
   setting values in the first, the second, and the third registers in accordance with the value provided by an I/O device.

10. The method as claimed in claim 1, wherein the I/O device or a state on the I/O device to receive the I/O instruction comprises a work order module; and
   the I/O instruction comprises a request to operate on a work tag.

11. A method for input/output (I/O) value determination at a processor core, comprising:
- generating an I/O instruction comprising at least a virtual address;
- comparing the virtual address from the I/O instruction with a database of virtual addresses mapped to I/O devices and when the comparing is successful
  - determining the I/O device or a state on the I/O device to receive the I/O instruction in accordance with a physical address corresponding to the virtual address;
  - setting a value in a first register to a value identifying the determined I/O device or the state on the I/O device;
  - predicting a value to be set in a second register in accordance with the physical address; and
  - setting a value in a third register.

12. The method as claimed in claim 11, wherein when the comparing is unsuccessful, further comprising:
- translating the virtual address to a physical address;
- comparing the physical address from the I/O instruction with a database of physical addresses assigned to I/O devices and when the comparing is successful updating the database of virtual addresses;
- determining the I/O device or a state on the I/O device to receive the I/O instruction in accordance with the physical address;
- setting a value in a first register to a value identifying the determined I/O device or the state on the I/O device;
- predicting a value to be set in a second register in accordance with the physical address; and
- setting a value in a third register.

13. The method as claimed in claim 12, wherein the comparing is unsuccessful:
- abstaining from setting values in any of the first, the second, and the third registers.

14. The method as claimed in claim 11, wherein when the comparing is unsuccessful, further comprising:
- translating the virtual address to a physical address;
- comparing the physical address from the I/O instruction with a database of physical addresses assigned to I/O devices and when the comparing is successful updating the database of virtual addresses;
- regenerating the I/O instruction comprising at least a virtual address;
- comparing the virtual address from the regenerated I/O instruction with a database of virtual addresses mapped to I/O devices;
- determining the I/O device or a state on the I/O device to receive the regenerated I/O instruction in accordance with a physical address corresponding to the virtual address;
- setting a value in a first register to a value identifying the determined I/O device or the state on the I/O device;
- predicting a value to be set in a second register in accordance with the physical address; and
- setting a value in a third register.

15. The method as claimed in claim 14, wherein the comparing is unsuccessful:
- abstaining from setting values in any of the first, the second, and the third registers.

16. The method as claimed in claim 11, wherein the determining an I/O device or a state on the I/O device to receive the I/O instruction in accordance with the physical address, comprises:
- examining a value of a first subset of bits of the physical address; and
- determining the I/O device or the state of the I/O device according to the value of the first subset of bits.

17. The method as claimed in claim 11, wherein predicting a value to be set in a second register in accordance with the physical address, comprises:
- determining values of a second and third subsets of bits of the physical address;
- setting the value in the second register to a first value if the third subsets of bits equals a first predetermined value; and
- setting the value in the second register to a second value if the third subsets of bits equals a second predetermined value.

18. The method as claimed in claim 11, further comprising:
- determining a type of the I/O instruction;
- when the type of I/O instruction is other than a request I/O instruction providing the I/O instruction to the I/O device; and
- setting a value in a register at the I/O device according to the provided I/O instruction.

19. The method as claimed in claim 18, wherein when the type of I/O instruction is a request I/O instruction, comprising:
- comparing the identifier of the I/O device or the state on the I/O device with the value in the first register, and when the comparing is successful
  - abstaining from forwarding the request I/O instruction to the I/O device; and
  - reading the value in the second register.

20. The method as claimed in claim 19, wherein when the comparing is unsuccessful, comprising:
- providing the request I/O instruction to the I/O device;
- reading a value in the register at the I/O device; and
- reporting the value together with the identifier of the I/O device or the state of the I/O device providing the value to the processor core.

21. The method as claimed in claim 11, further comprising:
- monitoring a value or change thereof in a register at the I/O device; and
- providing the value or a change thereof together with an identifier of the I/O device or the state on the I/O device providing the value to the processor core upon detecting the change.

22. The method as claimed in claim 21, further comprising:
- setting values in the first, the second, and the third registers in accordance with the value provided by an I/O device.

23. The method as claimed in claim 11, the I/O device or a state on the I/O device to receive the I/O instruction comprises a work order module; and
- the I/O instruction comprises a request to operate on a work tag.

24. A apparatus for input/output (I/O) value determination, comprising:
- a processor core configured to generate an I/O instruction comprising at least a physical address;
- a comparator configured to compare the physical address from the I/O instruction with a database of physical addresses assigned to I/O devices; and
- a controller configured to receive the result from the comparator and when the comparison is successful determine the I/O device or a state on the I/O device to receive the I/O instruction in accordance with the physical address;

set a value of a first register to a value identifying the determined I/O device or the state on the I/O device;

predict a value to be set in a second register in accordance with the physical address; and set a value in a third register.

25. The apparatus as claimed in claim 24, wherein when the comparison is unsuccessful:

the controller is configured to abstain from setting values in any of the first, the second, and the third registers.

26. The apparatus as claimed in claim 24, wherein the controller determines the I/O device or a state on the I/O device to receive the I/O instruction in accordance with the physical address by being further configured to:

examine a value of a first subset of bits of the physical address; and determine the I/O device or the state of the I/O device according to the value of the first subset of bits.

27. The apparatus as claimed in claim 24, wherein the controller predicts a value to be set in a second register in accordance with the physical address by being further configured to:

determine values of a second and third subsets of bits of the physical address;

set the value in the second register to a first value if the third subsets of bits equals a first predetermined value; and set the value in the second register to a second value if the third subsets of bits equals a second predetermined value.

28. The apparatus as claimed in claim 24, wherein the controller is further configured to:

determining a type of the I/O instruction;

when the type of I/O instruction is other than a request I/O instruction provide the I/O instruction to the I/O device; and set a value of a register at the I/O device according to the provided I/O instruction.

29. The apparatus as claimed in claim 28, wherein the controller is further configured to:

compare the identifier of the I/O device or the state on the I/O device with the value in the first register, and when the comparison is successful abstain from forwarding the request I/O instruction to the I/O device; and read the value in the second register.

30. The apparatus as claimed in claim 29, wherein when the comparison is unsuccessful, the controller is configured to provide the request I/O instruction to the I/O device; and wherein a controller at the I/O device is configured to read a value in the register at the I/O device; and report the value together with an identifier of the I/O device or the state of the I/O device providing the value to the processor core.

31. The apparatus as claimed in claim 24, wherein controller at the I/O device is further configured to:

monitor a value or change thereof in a register at the I/O device; and provide the value or a change thereof together with an identifier of the I/O device or the state on the I/O device providing the value to the processor core upon detecting the change.

32. The apparatus as claimed in claim 24, wherein the controller is further configured to:

set values in the first, the second, and the third registers in accordance with the value provided by an I/O device.

33. The apparatus as claimed in claim 24, wherein the I/O device or a state on the I/O device to receive the I/O instruction comprises a work order module; and the I/O instruction comprises a request to operate on a work tag.

34. An apparatus for input/output (I/O) value determination, comprising:

a processor core configured to generate an I/O instruction comprising at least a virtual address;

a comparator configured to compare the virtual address from the I/O instruction with a database of virtual addresses mapped to I/O devices; and a controller configured to receive the result from the comparator and when the comparison is successful determine the I/O device or a state on the I/O device to receive the I/O instruction in accordance with a physical address corresponding to the virtual address;

set a value in a first register to a value identifying the determined I/O device or the state on the I/O device;

predict a value to be set in a second register in accordance with the physical address; and set a value in a third register.

35. The apparatus as claimed in claim 34, wherein when the comparing is unsuccessful:

the controller is further configured to translate the virtual address to a physical address;

the comparator is further configured to compare the physical address from the I/O instruction with a database of physical addresses assigned to I/O devices and when the comparing is successful the controller is further configured to update the database of virtual addresses;

determine the I/O device or a state on the I/O device to receive the I/O instruction in accordance with the physical address;

set a value in a first register to a value identifying the determined I/O device or the state on the I/O device;

predict a value to be set in a second register in accordance with the physical address; and set a value in a third register.

36. The apparatus as claimed in claim 35, wherein comparing is unsuccessful:

the controller is further configured to abstain from setting values in any of the first, the second, and the third registers.

37. The apparatus as claimed in claim 34, wherein when the comparing is unsuccessful, further comprising:

the controller is further configured to translate the virtual address to a physical address;

the comparator is further configured to compare the physical address from the I/O instruction with a database of physical addresses assigned to I/O devices and when the comparing is successful the controller is further configured to update the database of virtual addresses;

the processor core is further configured to regenerate the I/O instruction comprising at least a virtual address;

the comparator is further configured to comparing the virtual address from the regenerated I/O instruction with a database of virtual addresses mapped to an I/O device; and the controller is further configured to determine the I/O device or a state on the I/O device to receive the regenerated I/O instruction in accordance with a physical address corresponding to the virtual address;

set a value in a first register to a value identifying the determined I/O device or the state on the I/O device;

predict a value to be set in a second register in accordance with the physical address; and set a value in a third register.

38. The apparatus as claimed in claim 37, wherein the comparing is unsuccessful:

the controller is further configured to abstain from setting values in any of the first, the second, and the third registers.

39. The apparatus as claimed in claim 34, wherein the controller determines the I/O device or a state on the I/O device to receive the I/O instruction in accordance with the physical address by being further configured to:

examine a value of a first subset of bits of the physical address; and determine the I/O device or the state of the I/O device according to the value of the first subset of bits.

40. The apparatus as claimed in claim 34, wherein the controller predicts a value to be set in a second register in accordance with the physical address, by being further configured to:

determine values of a second and third subsets of bits of the physical address;

set the value in the second register to a first value if the third subsets of bits equals a first predetermined value; and set the value in the second register to a second value if the third subsets of bits equals a second predetermined value.

41. The apparatus as claimed in claim 34, wherein the controller is further configured to:

determine a type of the I/O instruction;

when the type of I/O instruction is other than a request I/O instruction provide the I/O instruction to the I/O device; and set a value in a register at the I/O device according to the provided I/O instruction.

42. The apparatus as claimed in claim 41, wherein when the type of I/O instruction is a request I/O instruction, the controller is further configured to:

compare the identifier of the I/O device or the state on the I/O device with the value in the first register, and when the comparing is successful abstain from forwarding the request I/O instruction to the I/O device; and read the value in the second register.

43. The apparatus as claimed in claim 42, wherein when the comparing is unsuccessful, the controller is further configured to provide the request I/O instruction to the I/O device; and a controller at the I/O device is configured to read a value in the register at the I/O device; and report the value together with the identifier of the I/O device or the state of the I/O device providing the value to the processor core.

44. The apparatus as claimed in claim 34, wherein the controller at the I/O device is configured to:

monitor a value or change thereof in a register at the I/O device; and provide the value or a change thereof together with an identifier of the I/O device or the state on the I/O device providing the value to the processor core upon detecting the change.

45. The apparatus as claimed in claim 44, wherein the controller is further configured to:

set values in the first, the second, and the third registers in accordance with the value provided by an I/O device.

46. The apparatus as claimed in claim 34, wherein the I/O device or a state on the I/O device to receive the I/O instruction comprises a work order module; and the I/O instruction comprises a request to operate on a work tag.

* * * * *